Patented Oct. 2, 1951

2,569,803

UNITED STATES PATENT OFFICE 2,569,803

BIS(ALKYLBENZYL)DIMETHYL AMMONIUM HALIDES

Peter L. de Benneville, Philadelphia, Pa., and Louis H. Bock, Shelton, Wash., assignors to Rohm & Haas Company, Philadelphia, Pa., a corporation of Delaware No Drawing. Application June 29, 1949, Serial No. 102,142

5 Claims. (Cl. 260—567.6)

This invention relates to bis(alkylbenzyl) dimethyl ammonium salts which are characterized by high efficiency in their bactericidal, bacteriostatic, and fungicidal activities.

In our application Serial No. 28,273, filed May 20, 1948, of which the instant application is a continuation-in-part, we have described an effective method for introducing a halomethyl group into an alkylbenzene in which the alkyl group contains more than two carbon atoms and for converting alkylbenzyl halides into quaternary ammonium salts. We have further shown in this prior application that dimethylamine reacts with an alkylbenzyl halide to form a tertiary amine, which in turn may be reacted with an alkylbenzyl halide to form a bis(alkylbenzyl) dimethyl ammonium halide. The class of quarternary ammonium salts thus prepared is novel.

Within this new class of salts we have discovered a group which is of unusual and outstanding utility because the particular members thereof have a useful balance of properties. They are particularly characterized by their marked bactericidal and fungicidal activities. They are highly active against Gram-positive organisms generally and quite effective against Gram-negative organisms. They are rather bland and mild in their properties otherwise. With their high degree of effectiveness they have sufficient solubility in aqueous systems and also in oil systems to support their practical application from both types of solutions.

The quaternary salts here claimed have the formula

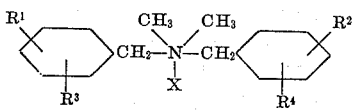

wherein $R^1$ and $R^2$ represent alkyl substituents of three to ten carbon atoms each, the total number of carbon atoms in $R^1$ and $R^2$ being at least ten and not exceeding fifteen, $R^3$ and $R^4$ represent hydrogen or the methyl group, the total number of carbon atoms in the ring substituents not exceeding sixteen, and X represents chlorine or bromine. The highest bactericidal efficiency is obtained when $R^1$ and $R^2$ contain five to eight carbon atoms each and the total carbon content of $R^1$ and $R^2$ is twelve to fourteen carbon atoms. The chlorides are the preferred type of salt.

For any single compound $R^1$ and $R^2$ may be different or the same. One alkylbenzyl group may contain a methyl substituent and the other be free thereof; the alkylbenzyl groups may each contain a methyl group provided the total number of carbon atoms in the substituents of the two phenyl rings does not exceed sixteen; or neither phenyl ring may contain a substituent other than $R^1$ or $R^2$, in which case the total number of carbon atoms in the two substituents does not exceed fifteen.

As indicated above, these bis(alkylbenzyl) dimethyl ammonium halides are prepared by reacting in substantially equivalent proportions an alkylbenzyl halide and an alkylbenzyldimethylamine. The two reactants are mixed and preferably heated together at 50° to 120° C. The reaction may, if desired, be carried out in the presence of an organic solvent, such as an aromatic hydrocarbon, benzene, toluene, and xylene being useful examples thereof, an alcohol, ethyl, isopropyl, and butyl alcohols being suitable, or other solvents including nitroparaffins, formamide, acetonitrile, and the like. Heating is conveniently done at reflux temperatures and continued until tests show a high proportion of ionizable halide. Reaction times of two to twenty-four hours are generally useful to give good conversions to quaternary form.

The alkylbenzyl halides can be prepared through the halomethylation of corresponding alkylbenzenes or alkyltoluenes. Conditions for halomethylation, we have found, depend upon the size of the alkyl group attached to the benzene nucleus. Methods of the art may be satisfactorily applied to isopropylbenzene or isopropylmethylbenzene. These react at 60° C. with formaldehyde, as supplied from paraformaldehyde, and hydrogen chloride or hydrogen bromide in the presence of zinc chloride to give good yields of isopropylbenzyl chloride or isopropylmethylbenzyl chloride or the bromides. When this method is applied to larger alkylbenzenes, however, yields fall off rapidly as the size of the alkyl group is increased until with an octylbenzene the methods of the art are of little, if any, value.

With alkyl substituents of about eight or more carbon atoms chloromethylation is effected by the method which we have described in our application Serial No. 28,274, filed on May 20, 1948. Bromomethylation can be effected under comparable conditions. As there shown, a single chloromethyl group can be introduced without formation of troublesome resinous products by reacting a long-chained alkylbenzene or alkyltoluene with hydrogen chloride and anhydrous formaldehyde in the presence of a catalyst mixture formed by mixing one molecular proportion of zinc chloride with 1.5 to 8 molecular proportions of an aliphatic monocarboxylic acid of one to three carbon atoms, such as formic, acetic, chloroacetic, or propionic. Acid anhydrides may be used in place of these acids or in admixture therewith. Formaldehyde may be used as a gas or as a revertible polymer. The equivalent of formaldehyde and hydrogen bromide or chloride is obtained by use of a halomethyl ether. For one mole equivalent of alkylbenzene from one to 2.5, and preferably 1.5 to 2.5, molecular equivalents of formaldehyde are used together with 0.75 to 2.5 molecular equivalents of zinc chloride accompanied by the proportion of monocarboxylic acid stated above. Reaction temperatures of 50° to 100° C. are used. Yields are very good when this method is applied to alkylated benzenes of the specified sizes.

When this method is applied to lower alkylbenzenes, it becomes less favorable as the size of the alkyl group decreases. Thus, this method requires some adjustment for good yields of halomethylated alkylbenzenes in the intermediate range, such as use of additional diluent when zinc chloride is used and/or lower temperatures. The conditions of halomethylation in any case should be so selected as to avoid polyhalomethylation and formation of resinous by-products and yet ensure the introduction of one halomethyl group per alkylbenzene molecule.

The alkylated benzene hydrocarbons which are useful here include both alkylbenzenes and alkyltoluenes. In the latter the relative positions of the alkyl group and methyl group on the benzene rings are not of significance. The alkyl groups may be of straight or branched chain structure and be primary, secondary, or tertiary, as introduced by generally known methods. Thus, benzene or toluene may be reacted with an acyl halide and the introduced acyl group reduced or they may be reacted with an olefinic hydrocarbon. The useful alkyl groups vary in size from propyl to decyl, as has been stated.

Typical of the starting alkylated benzenes are propylbenzene, isopropylbenzene, o-, m-, or p-isopropyltoluene, butylbenzene, sec.-butylbenzene, tert.-butylbenzene, o-, m-, or p-butyl-toluene, p-tert.-butyltoluene, sec.-amylbenzene, tert.-amylbenzene, p-tert.-amyltoluene, o-amyltoluene, p-tert.-octyltoluene, sec.-octylbenzene, sec.-nonylbenzene, p-sec.-nonyltoluene, sec.-decylbenzene, 3-heptylbenzene, 4,4-dimethylpentylbenzene, 3-(3-heptyl)toluene, etc.

From an alkylbenzyl halide there is prepared an alkylbenzyldimethylamine by reaction of said halide and dimethylamine. This reaction is effected conveniently with dimethylamine itself or a solution thereof. The acid group formed is neutralized with a strong base or an excess of dimethylamine and the desired tertiary amine separated. Reaction by addition of an alkylbenzyldimethylamine and an alkylbenzyl halide yields the desired bis(alkylbenzyl) dimethyl ammonium halide, as described above.

Additional details of preparing the compounds of this invention are presented in the following illustrative examples, which are divided into three parts. In Part A the examples show typical preparations of alkylbenzyl halides. In Part B the preparation of alkylbenzyldimethylamines is illustrated. In Part C typical methods of converting these amines to quaternary ammonium halides are shown.

PREPARATION OF ALKYLBENZYL HALIDES

EXAMPLE A-1

A mixture was made in a reaction vessel of 134 parts by weight of sec.-butylbenzene, 122 parts of anhydrous zinc chloride, and 180 parts of glacial acetic acid. While the mixture was stirred, there was added thereto 127 parts of dichloromethyl ether. The temperature was raised to 50° C. and maintained there for four hours. The reaction mixture was allowed to stand and separate into layers. The upper layer was taken, washed with a solution of sodium bicarbonate, and distilled. At 80° to 96° C. at 0.35 mm. pressure there were obtained 33 parts of a product which by analysis corresponded in composition to butylbenzyl chloride. The chlorine content of this material was found to be 19.4%; theory for this product is 19.5% of chlorine.

EXAMPLE A-2

There were mixed in a reaction vessel equipped with a stirrer 74 parts of commercially available amylbenzene, 61 parts of anhydrous zinc chloride, and 90 parts of glacial acetic acid. Thereto was added very slowly 63 parts of dichloromethyl ether. The mixture was then heated at 50° C. for four hours. The product was isolated as in the example above. The product was distilled at 97°–118° C./1 mm. It contained 18.1% of chlorine by analysis (theory 18.0%) and was identified as amylbenzyl chloride.

EXAMPLE A-3

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

EXAMPLE A-4

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

EXAMPLE A–5

Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held to 0°–10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonyl benzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

EXAMPLE A–6

To a mixture of 312 parts of benzene and 180 parts of sulfuric acid was added dropwise at 10°–20° C. 281 parts of decene, which was freshly prepared by dehydration of n-decanol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

A mixture of 54.5 parts of this sec.-decylbenzene, 27.3 parts of zinc chloride, and 60 parts of glacial acetic acid was stirred and heated to 70°–75° C. while 28.8 parts of dichloromethyl ether was slowly added. Stirring was continued at 70°–80° C. for five hours. Layers were allowed to form. The upper layer was separated, washed with water and sodium bicarbonate solution, dried, and distilled. At 155°–175° C./1.8 mm. there was obtained a fraction of 30 parts which corresponded in composition to sec.-decylbenzyl chloride.

EXAMPLE A–7

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

EXAMPLE A–8

To a mixture of 53 parts of isopropylbenzene, 17 parts of paraformaldehyde, and 100 parts of acetic acid, hydrobromic acid was added in an amount of 70 parts and hydrogen bromide gas passed in for several hours. The mixture was heated at 50° for another two hours. The mixture was washed with water, with sodium bicarbonate solution, and again with water and the bromomethylated isopropylbenzene recovered therefrom.

EXAMPLE A–9

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid, while the mixture was stirred and held at 5° C. The mixture was stirred for three hours more while the temperature was carried to about 30° C. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and form layers. The layers were separated and the upper layer was washed with water, with sodium bicarbonate solution, and with water again, and distilled. The fraction collected at 127°–132° C./2 mm., amounting to 128 parts, corresponded in composition to heptylbenzyl chloride. This was primarily the para-isomer.

EXAMPLE A–10

A mixture of 95 parts of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C., while hydrogen chloride was passed in for two hours at a fairly rapid rate. The reaction mixture was allowed to form layers, which were separated. The upper layer was washed with hot water, with a 10% sodium bicarbonate solution, and with hot water, dried over sodium sulfate, and distilled. The forerun of 30 parts consisted of octylbenzene. There was then obtained at 119°–120° C./1 mm. 71 parts of octylbenzyl chloride.

Example A-11

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

In the same way other alkylbenzenes or alkyltoluenes are converted to alkylbenzyl chlorides or bromides. While the chlorides have been indicated as preferable, it will be evident to those skilled in the art that bromides may also be prepared by generally equivalent procedures and used in the same way as the chlorides. In particular, the alkylbenzyl bromides may be combined with an alkylbenzyldimethylamine to give a quaternary ammonium bromide.

PREPARATION OF ALKYLBENZYLDIMETHYLAMINES

Example B-1

Into a reaction vessel connected to a condensing system chilled with Dry Ice and acetone there was run 50 parts by weight of a 40% aqueous dimethylamine solution and 17 parts of sodium hydroxide was carefully added thereto. With the temperature of the above mixture at about 25° C. there was added dropwise 44 parts of amylbenzyl chloride. The resulting mixture was heated on a water-bath while dimethylamine gas was passed in until the mixture was saturated therewith. The mixture was heated for another two hours, washed with water until neutral to litmus, separated, dried over calcium chloride, and distilled. The fraction obtained at 100°–103° C./1.1 mm. corresponded to amylbenzyldimethylamine having a purity of 99%.

Example B-2

In the same way 100 parts of a 40% aqueous dimethylamine solution, 10 parts of sodium hydroxide in 35 parts of water, and 30 parts of sec.-butylbenzyl chloride were mixed and reacted while dimethylamine was passed into the mixture. The product was taken up in benzene and washed free of alkalinity. The solvent was stripped off to leave 11.3 parts of product which contained 96.3% of sec.-butylbenzyldimethylamine.

Example B-3

In the same way sec.-octylbenzyl chloride was reacted with dimethylamine. The product was taken up in benzene, washed free of alkalinity, and recovered as a residue of practically pure octylbenzyldimethylamine.

Example B-4

The above method was applied to the reaction of dimethylamine and decylbenzyl chloride. The product was obtained as a residue and corresponded in composition to decylbenzyldimethylamine.

Example B-5

Dimethylamine and 4-heptyl-2-methylbenzyl chloride were reacted. The product obtained corresponded in composition to heptylmethylbenzyldimethylamine.

In the same way dimethylamine may be reacted with other benzyl halides, whether chlorides or bromides, to give the corresponding tertiary amines.

PREPARATION OF BIS(ALKYLBENZYL) DIMETHYL AMMONIUM HALIDES

Example C-1

A solution was made of 8.9 parts by weight of isopropylbenzyldimethylamine and 15.4 parts of decylbenzyl chloride in 20 parts of acetonitrile. The solution was heated under reflux for sixteen hours. The solvent was then removed under reduced pressure. There was obtained as a residue 24 parts of isopropylbenzyl decylbenzyl dimethyl ammonium chloride.

Example C-2

A solution of 9.6 parts by weight of sec.-butylbenzyldimethylamine, 11.9 parts of octylbenzyl chloride, and 40 parts of acetonitrile was refluxed for 10 hours. The acetonitrile was distilled off and the residue heated in vacuo. There was obtained 22 parts of a clear, light brown, resinous mass which corresponded approximately in composition to butylbenzyl octylbenzyl dimethyl ammonium chloride.

Example C-3

In the same way 9.6 parts of sec.-butylbenzyldimethylamine, 14 parts of nonylbenzyl chloride, and 40 parts of acetonitrile were heated under reflux for 12 hours. The solvent was removed and a residue obtained which corresponded in composition to sec.-butylbenzyl nonylbenzyl dimethyl ammonium chloride.

Example C-4

By the same procedure 9.6 parts of sec.-butylbenzyldimethylamine and 12.6 parts of methyloctylbenzyl chloride were reacted to give 24 parts of sec.-butylbenzyl methyloctylbenzyl dimethyl ammonium chloride.

Example C-5

There were reacted by the above procedures 14 parts of nonylbenzyl chloride and 10.3 parts of amylbenzyldimethylamine. There was obtained nonylbenzyl amylbenzyl dimethyl ammonium chloride in an amount of 22 parts.

Example C-6

A solution of 21.3 parts of octylbenzyl dimethylamine, 13.5 parts of isopropylbenzyl chloride, and 40 parts of acetonitrile was heated under reflux for six hours. The solvent was then stripped off. There was obtained 31 parts of a soft, waxy residue which corresponded in composition to isopropylbenzyl octylbenzyl dimethyl ammonium chloride.

Example C-7

Reaction of 14.2 parts of octylbenzyldimethylamine and 9.8 parts of amylbenzyl chloride for 16 hours at about 85° C. yielded 23 parts of a soft wax which corresponded in composition to amylbenzyl octylbenzyl dimethyl ammonium chloride.

Example C-8

A solution of 10 parts of hexylbenzyl chloride and 10 parts of hexylbenzyldimethylamine in 25 parts of acetonitrile and 10 parts of toluene was heated under reflux for three hours. The solvents were removed with final stripping in vacuo to yield a colorless, hard wax which consisted chiefly of bis(hexylbenzyl) dimethyl ammonium chloride.

EXAMPLE C-9

A mixture of 16 parts of isopropylbenzyl bromide and 13 parts of (1-ethyl-3,3-dimethylbutyl) benzyldimethylamine in 25 parts of toluene was heated on a steam bath for four hours. Solvent was removed under reduced pressure and a light tan solid obtained which consisted chiefly of isopropylbenzyl octylbenzyl dimethyl ammonium bromide.

EXAMPLE C-10

A solution of 23.8 parts of heptylmethylbenzyl chloride and 24.6 parts of heptylxylyldimethylamine in 56.9 parts of nitromethane was heated on the steam bath for six hours. The nitromethane was distilled off under reduced pressure to yield 44.5 parts of a brittle resin-like residue which corresponded in composition to bis(heptylmethylbenzyl) dimethyl ammonium chloride.

EXAMPLE C-11

A solution of 30 parts of hexylxylyldimethylamine and 28.7 parts of hexylxylyl chloride in 75 parts of acetonitrile was heated under reflux for 16.5 hours. The solvent was stripped off under reduced pressure and bis(hexylmethylbenzyl) dimethyl ammonium chloride obtained as a residue.

EXAMPLE C-12

By the above procedure 5.96 parts of 2-ethylhexylbenzyl chloride and 5.15 parts of amylbenzyldimethylamine were reacted in acetonitrile to yield 11 parts of a gummy residue which consisted essentially of 2-ethylhexylbenzyl amylbenzyl dimethyl ammonium chloride.

By the generally similar methods there may be reacted other alkyl benzyl halides and alkylbenzyldimethylamines to give quaternary ammonium halides. Quaternary salts in which $R^1$, $R^2$, $R^3$ and $R^4$ in the general formula above have the prescribed relations are exceptionally powerful germicides and fungicides. This is shown by the following tabulation of phenol coefficients for various compounds of this invention. These coefficients were determined by the standard F. D. A. method against *Salmonella typhosa* and *Staphylococcus aureus*.

Table I
SUMMARY OF EVALUATION OF QUATERNARY CHLORIDES

| Ring Substituents | | | | Coefficients vs.— | |
|---|---|---|---|---|---|
| $R^1$ | $R^2$ | $R^3$ | $R^4$ | S. typhosa | S. aureus |
| iso-$C_3H_7$ | $C_{10}H_{21}$ | H | H | 275 | 570 |
| sec.-$C_4H_9$ | $C_8H_{17}$ | H | H | 285 | 465 |
| sec.-$C_4H_9$ | $C_8H_{17}$ | H | $CH_3$ | 320 | 355 |
| sec.-$C_4H_9$ | $C_9H_{19}$ | H | H | 330 | 500 |
| sec.-$C_4H_9$ | $C_{10}H_{21}$ | H | H | 320 | 750 |
| $C_5H_{11}$ | $C_8H_{11}$ | H | H | 300 | 455 |
| $C_5H_{11}$ | $C_8H_{17}$ | H | $CH_3$ | 330 | 640 |
| $C_5H_{11}$ | $C_9H_{19}$ | H | H | 330 | 665 |
| $C_6H_{13}$ | $C_6H_{13}$ | $CH_3$ | $CH_3$ | 555 | 750 |
| $C_7H_{15}$ | $C_7H_{15}$ | $CH_3$ | $CH_3$ | 555 | 580 |
| $C_8H_{11}$ | $C_8H_{17}$ | H | H | 560 | 2,000 |

Quaternary ammonium bromides are prepared by exactly the same procedures as shown above, but with substitution of appropriate bromides for chlorides. As typical of such a change, the following example is given.

EXAMPLE C-13

A mixture was made from 28.3 parts of 2-octylbenzyl bromide, 20.5 parts of amylbenzyldimethylamine, and 200 parts of benzene. It was heated under reflux for an hour and was allowed to stand for 16 hours. It was then heated under reduced pressure to drive off the solvent. The residue was primarily octylbenzyl amylbenzyl dimethyl ammonium bromide. It was a gummy solid which was slightly soluble in water. It had a phenol coefficient of 500 against *Salmonella typhosa* and of 1250 against *Staphylococcus aureus*. It was powerfully fungicidal.

The compounds of this invention are bacteriostatic and bactericidal at considerable dilutions. They are active against both Gram-positive and Gram-negative organisms. A summary of a typical series of dilution tests is given in Table II. There the highest dilutions at which amylbenzyl octylbenzyl dimethyl ammonium chloride gave bacteriostatic (Bs) and bactericidal (Bc) actions are shown.

Tests were made against various organisms by a successive dilution method utilizing trypticase-soy broth. One per cent solutions of the product under test were diluted with broth and the various dilutions were autoclaved for ten minutes at 10 to 12 pounds pressure. They were cooled and inoculated with a 4 mm. loopful of a test organism culture. Incubation was carried out at 37° C. for 24 hours. The highest dilution showing no growth gave the end-point for bacteriostatic action. After an additional 24 hour period of incubation at 37° C. subcultures were made by transferring three loopfuls from cultures showing no growth to fresh broth. The subcultures were incubated 48 hours at 37° C. The highest dilution showing no growth was the end-point for bactericidal action.

Table II
EFFECTIVE DILUTIONS (TIMES 1/1000) OF AMYLBENZYL OCTYLBENZYL DIMETHYL AMMONIUM CHLORIDE

| Organism | Gram-type | Effective Dilutions/1000 | |
|---|---|---|---|
| | | Bs | Bc |
| S. aureus | + | 4,000 | 2,000 |
| S. pyogenes | + | 16,000 | 4,000 |
| S. fæcalis | + | 1,000 | 512 |
| N. catarrhalis | − | 8,000 | 2,000 |
| S. typhosa | − | 512 | 128 |
| Ps. aeruginosa | − | 32 | 4 |
| P. vulgaris | − | 16 | 16 |
| B. suis | − | 2,000 | 512 |
| C. welchii | − | 1,000 | 512 |

Against the resistant organism *Ps. aeruginosa* and the very resistant organism *P. vulgaris*, by way of examples, amylbenzyl octylbenzyl dimethyl ammonium chloride is four to eight times as effective as widely used and currently available quaternary ammonium salts. Furthermore, tests of this type with this compound show no loss in activity when hard waters are used as the solvent media.

Against fungi the compounds of this invention have been found to be effective even at considerable dilutions. In fungi-toxicity tests made by the slide germination technique complete inhibition of germination of spores of such typical test organisms as *Macrosporium sarcinaeforme* and *Sclerotinia fructicola* is obtained in the range of dilutions of 1 in 100,000 to 1 in 1,000,000, depending upon the particular composition being examined.

The data establish the compounds of this in-

We claim:

1. As new substances, compounds of the formula

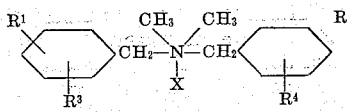

wherein $R^1$ and $R^2$ are alkyl substituents of three to ten carbon atoms each, the total number of carbon atoms in $R^1$ and $R^2$ being at least ten and not exceeding fifteen, $R^3$ and $R^4$ are selected from the class consisting of hydrogen and the methyl group, the total number of carbon atoms in $R^1$, $R^2$, $R^3$, and $R^4$ not exceeding sixteen, and X is a member of the class consisting of chlorine and bromine.

2. As new substances, compounds of the formula

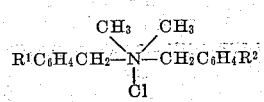

wherein $R^1$ and $R^2$ are alkyl groups of three to ten carbon atoms each, the total number of carbon atoms in $R^1$ and $R^2$ being at least ten and not exceeding fifteen and the $C_6H_4$ group being a benzene nucleus.

3. As a new substance, a compound of the formula

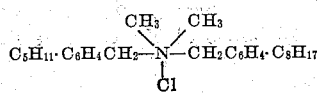

the $C_6H_4$ group representing a benzene nucleus.

4. As a new substance, a compound of the formula

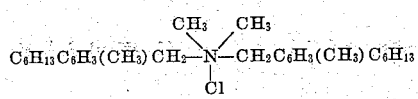

the $C_6H_3$ group representing a benzene nucleus.

5. As a new substance, a compound of the formula

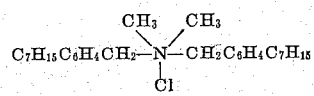

the $C_6H_4$ group representing a benzene nucleus.

PETER L. DE BENNEVILLE.
LOUIS H. BOCK.

REFERENCES CITED

The following references are of record in the file of this patent:

UNITED STATES PATENTS

| Number | Name | Date |
| --- | --- | --- |
| 2,200,603 | Hentrich | May 14, 1940 |
| 2,276,587 | Mettler et al. | Mar. 17, 1942 |
| 2,314,111 | Tucker et al. | Mar. 16, 1943 |

OTHER REFERENCES

Braun et al.: "Liebigs Annalen," vol. 490, pp. 189–200 (1931).

Braun et al.: "Liebigs Annalen," vol. 507, pp. 1 to 13 (1933).